United States Patent [19]
Sanders

[11] Patent Number: 5,706,707
[45] Date of Patent: Jan. 13, 1998

[54] STEERING WHEEL ARMATURE WITH STABILIZERS

[75] Inventor: Fritz Sanders, Livonia, Mich.

[73] Assignee: Breed Automotive Technology, Inc., Lakeland, Fla.

[21] Appl. No.: 677,461

[22] Filed: Jul. 2, 1996

[51] Int. Cl.⁶ .............................. B62D 1/04; G05G 1/10
[52] U.S. Cl. ........................... 74/552; 74/558; 29/894.1
[58] Field of Search .................... 74/552, 558; 29/894.1; 164/98; 264/274

[56] References Cited

U.S. PATENT DOCUMENTS

| | | | |
|---|---|---|---|
| 1,876,693 | 2/1932 | Kraft | 29/894.1 X |
| 1,905,926 | 4/1933 | Marbach et al. | 29/894.1 |
| 4,838,976 | 6/1989 | Sato | 74/552 X |
| 5,310,218 | 5/1994 | Miyoshi et al. | 74/552 X |

*Primary Examiner*—Charles A. Marmor
*Assistant Examiner*—Saul J. Rodriguez
*Attorney, Agent, or Firm*—Howard & Howard

[57] ABSTRACT

A composite steering wheel assembly comprises a molded armature frame including a central hub, a plurality of spokes radiating from the hub, and an annular rim encircling the spokes. An elastomeric material is molded around the spokes and the rim to provide a comfortable grip and aesthetically appealing appearance. The two bottom spokes each include a first stabilizer and a second stabilizer encased within the elastomeric material. The first stabilizer includes left and right fin surfaces extending from opposite lateral sides of the spokes and disposed in a plane generally perpendicular to the steering axis. The second stabilizer also includes left and right fin surfaces extending from opposite lateral sides of the spokes, but disposed in a plane generally parallel to the steering axis. The first and second stabilizers prevent sagging and dimples in the elastomeric material resulting from material shrinkage during the elastomeric material solidification process. The first and second stabilizers are molded integrally with the armature frame so that they will not slip out of position or become lost prior to the elastomeric material over molding procedure. Furthermore, the first and second stabilizers provide a consistent feel, i.e., compressibility, in the exaggeratedly wide sections of the elastomeric material covered sections of the steering wheel assembly.

10 Claims, 2 Drawing Sheets

STEERING WHEEL ARMATURE WITH STABILIZERS

BACKGROUND OF THE INVENTION

This invention relates to a steering wheel of the type used in motor vehicle applications, and more particularly toward an improved armature configuration over which is molded an elastomeric material.

Vehicle steering wheel assemblies are old and well. The typical prior art steering wheel assembly is composed of a skeletal armature frame which includes a central hub adapted to be securely coupled to the end of a steering shaft. Usually, two, three or four spokes radiate from the hub. To decrease both weight and cost, the spokes are preferably relatively thin. An annular rim is fixedly connected to the spokes and is disposed concentrically about the steering axis and the hub.

The armature frame is generally considered both aesthetically unappealing and unpleasant to the touch. Therefore, an elastomeric material is molded around at least a portion of the spokes and about the rim. The elastomeric material is comprised of an elastomeric cellular substrate covered by an exterior encapsulating skin. The elastomeric material may be composed of any suitable material such as PVC or one of the skinned foam urethanes. The elastomeric material is applied in an over molding operation, with the armature frame comprising the mold insert. Injected into the mold cavity, the PVC or urethane elastomeric material solidifies in spaces around the armature frame.

The final exterior appearance of the steering wheel assembly is established by design engineers, who may dictate that the elastomeric material surrounding the rim be provided with finger grooves to enhance grip and feel, or other design details. Likewise, it may be determined that the spokes should have an exaggeratedly wide appearance for aesthetic and/or functional reasons. If the armature has relatively thin spokes which do not provide adequate support for the wide shape of the elastomeric material, surface defects such as sagging or dimples may form on the elastomeric surface as a result of material shrinkage during the elastomeric material solidification process. The prior art has suggested small clip-on stabilizers, but such, while effective, have also tended to slip out of position or become lost prior to the elastomeric material over molding process. Furthermore, such loose-piece fabricated stabilizers add significantly to the cost of the steering wheel in that separate molds or dies must be constructed, the loose-piece stabilizers must be cataloged with part numbers and stored, and additional handling and assembly is needed to attach the loose-piece stabilizers to the armature.

SUMMARY OF THE INVENTION

The subject invention comprises a composite steering wheel assembly including a molded armature frame having a central hub, a spoke radiating from the hub, and an annular rim fixedly connected to the spoke and disposed concentrically about the hub. An elastomeric material is molded around at least a portion of the spoke. The spoke includes at least one stabilizer integrally molded therewith and encased within the elastomeric material for preventing distortion in the elastomeric material after solidification due to shrinkage.

The subject invention also contemplates a method of molding a composite steering wheel assembly comprising the steps of: forming an armature mold cavity having a central hub, a spoke radiating from the hub, having an integral stabilizer and an annular rim extending from the spoke and disposed concentrically about the hub; filling the armature mold cavity with molten metal to form an armature; solidifying the metal in the armature mold cavity and then removing the armature; forming an elastomeric material mold cavity; positioning the armature inside the elastomeric material mold cavity; filling the elastomeric material mold cavity with an elastomeric material around at least a portion of the spoke; solidifying the elastomeric material to form an elastomeric material around the spoke; and the step of forming the armature mold cavity to include the integral stabilizer on the spoke to be encased within the elastomeric material prevents distortion in the elastomeric material during the solidifying step.

Constructed in this manner, the stabilizer is effective to prevent sagging and dimples in the elastomeric material resulting from material shrinkage during the solidification process. The stabilizer is simultaneously molded with the entire armature frame so that it will not slip out of position or become lost prior to the elastomeric material over molding process. The stabilizer prevents distortion in the elastomeric material surface during its solidification by occupying volume and also presenting reinforcing fin surfaces to which the elastomeric material may adhere. Furthermore, the stabilizer provides a consistent feel, i.e., compressibility, in the exaggeratedly wide sections of the elastomeric material covered sections of the steering wheel assembly. Furthermore, the subject stabilizer does not add significantly to the cost of the steering wheel because it does not require a separate mold or die to fabricate, nor does it require special cataloging with part numbers or storage, nor additional handling and assembly to attach the loose-piece stabilizer to the armature.

BRIEF DESCRIPTION OF THE DRAWINGS

Other advantages of the present invention will be readily appreciated by reference to the following detailed description when considered in connection with the accompanying drawings wherein.

DESCRIPTION OF THE PREFERRED EMBODIMENT

Figure 1:
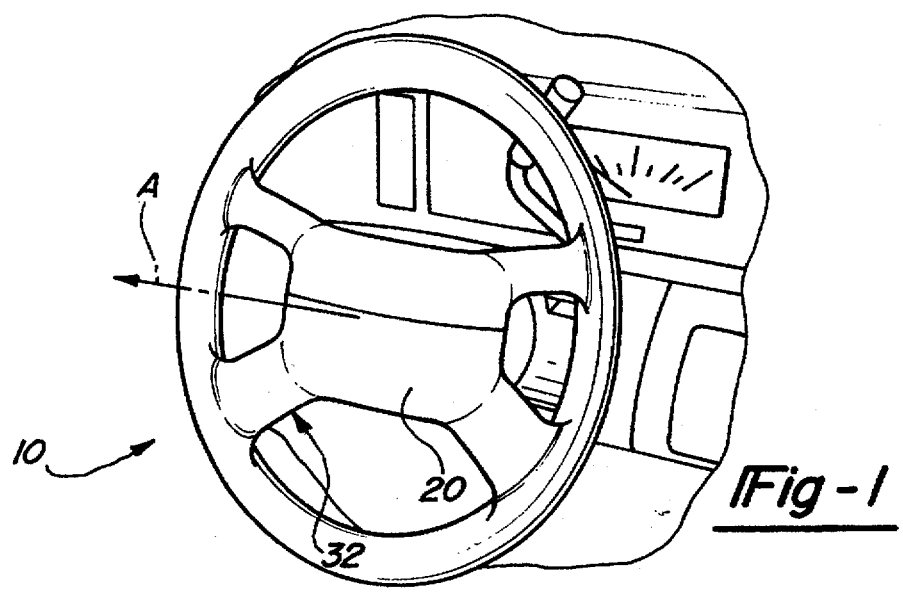
FIG. 1 is a perspective view showing a composite steering wheel assembly according to the subject invention.
Figure 2:
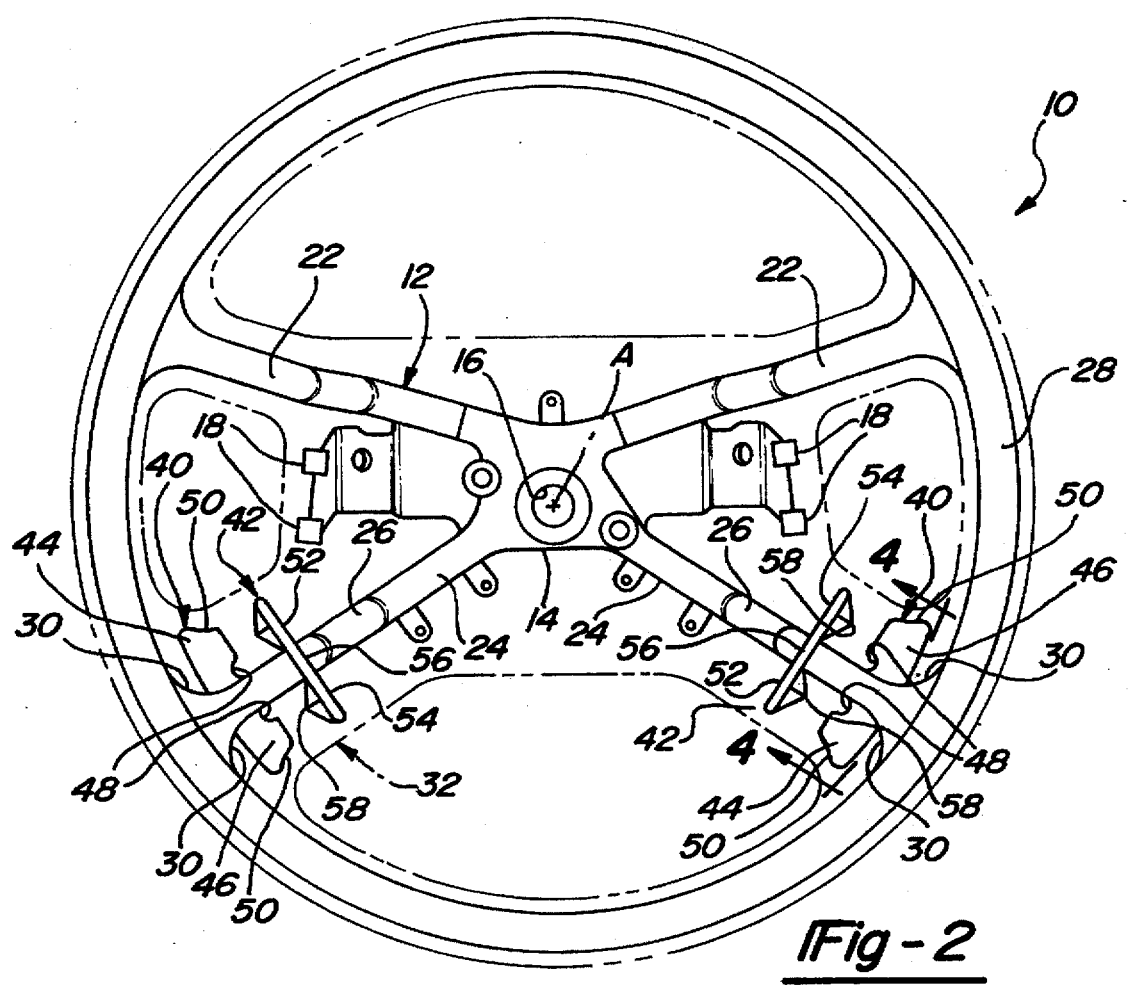
FIG. 2 is a front view of the armature frame of the steering wheel assembly showing the elastomeric material in phantom.

Referring to the Figures, wherein like numerals indicate like or corresponding parts throughout the several views, a composite steering wheel assembly according to the subject invention is generally shown at 10 in FIGS. 1 and 2. The steering wheel assembly 10 is of the type for manually controlling the wheels of a motor vehicle via a rotatable steering shaft and control linkage (none of which is shown), as is well known to those skilled in the art. The steering shaft together with the steering wheel assembly 10 rotate about a steering axis A.

As shown in FIG. 2, the steering wheel assembly 10 is composed of a skeletal armature frame generally indicated at 12. The armature frame 12 is molded in a pressure casting or other suitable technique from a magnesium alloy or other structural material. The armature frame 12 includes a central hub 14 having a steering shaft receptacle 16 adapted to securely couple to the end of the steering shaft. Mounting brackets 18 extend from opposite sides of the hub 14 for attaching an air bag module in the center 20 of the steering wheel.

Figure 4:
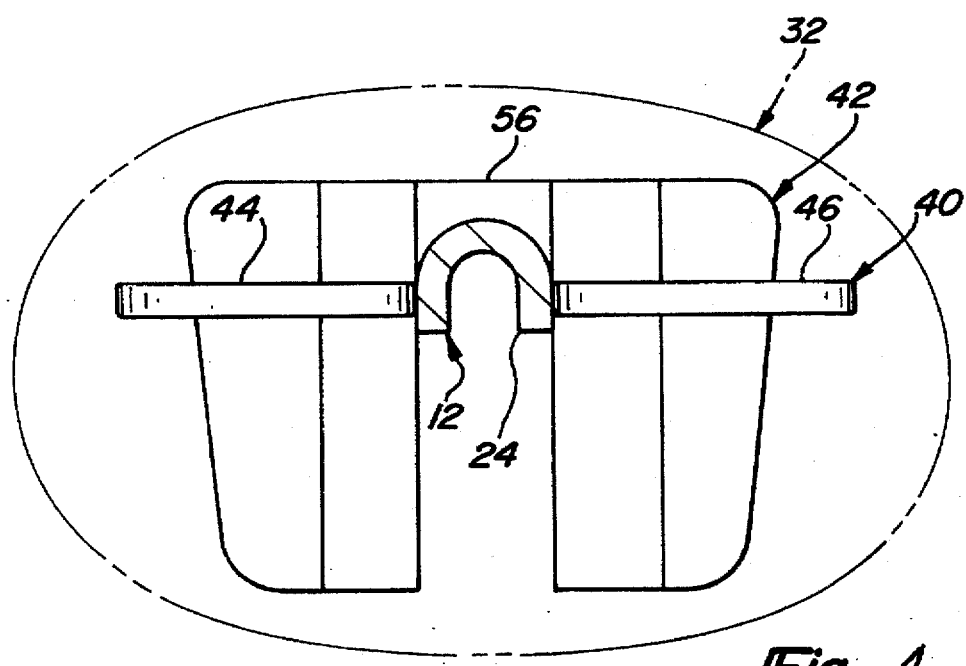
FIG. 4 is a cross-sectional view taken along lines 4—4 of FIG. 2.

In the preferred embodiment, two upper 22 and two lower 24 spokes radiate from the hub 14. The spokes 22, 24 may be contoured as required by the final design shape of the assembly 10. For example, the lower spokes 24 are each shown including a bent section 26 along its length. The bent section 26 are used since the hub 14 is typically spaced toward the plane of this figure from the hub 14. Also, the spokes 22, 24 may have a substantially consistent width, with a cross-sectional shape being generally U-shaped, as shown in FIG. 4. However, the spokes 22, 24 may have a variable width and/or another cross-sectional shape.

Figure 3:
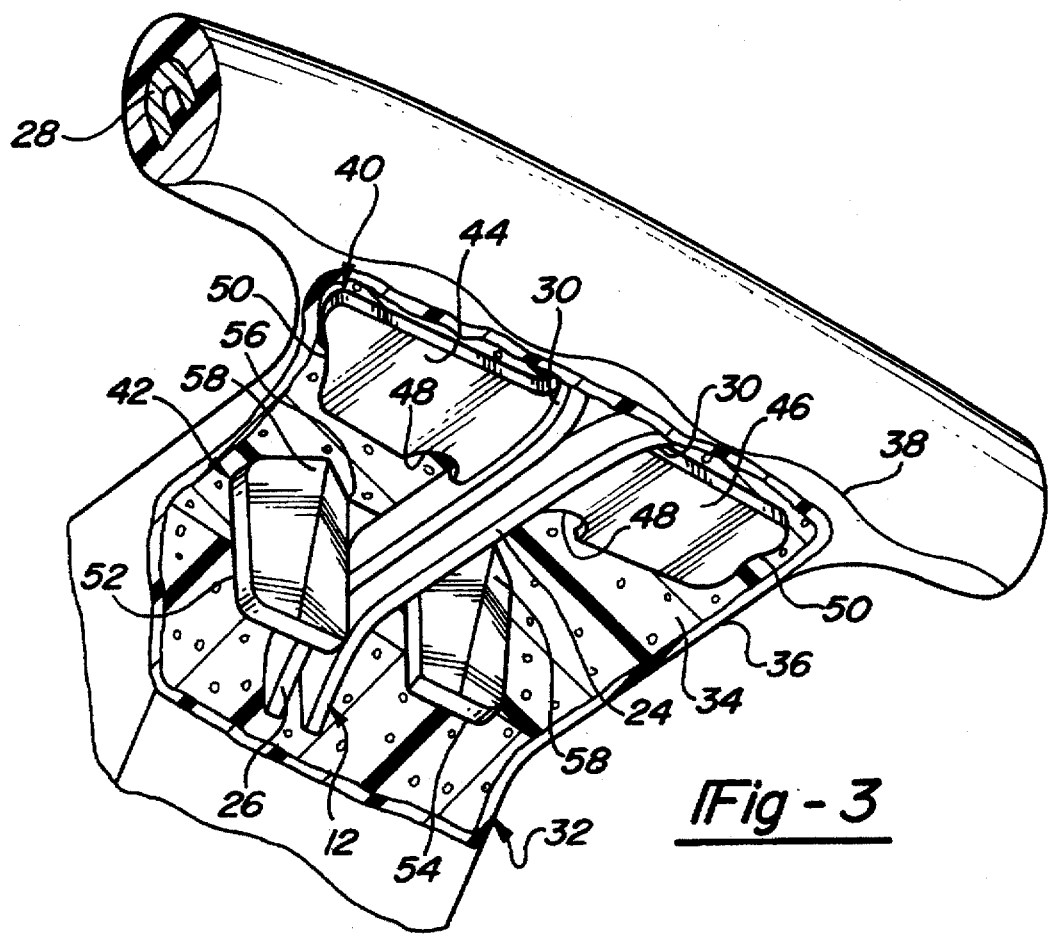
FIG. 3 is a fragmentary perspective view in partial cross section showing the first and second stabilizers of the subject invention.

An annular rim 28 is fixedly connected to the spokes 22, 24 and is disposed approximately concentrically about the steering axis A and the hub 14. Like the spokes 22, 24, the rim 28 also has a substantially consistent width, with a cross-sectional shape being generally U-shaped, as shown in FIG. 3. However, the rim 28 may have a variable width and/or another cross-sectional shape. The distal ends of the spokes 22, 24 include a pair of enlarged fillets 30 which are contiguous to and blend into the rim 28 to perfect a mechanically stable and stress-resistant intersection. In other words, each side of each spoke 22, 24 merges into the rim 28 with an enlarged fillet 30.

While the armature frame 12 is structurally capable of performing the requisite manual steering functions, it is both aesthetically unappealing and unpleasant to the touch. Therefore, an elastomeric material, generally indicated at 32, is molded around at least a portion of the spokes 22, 24 and about the rim 28. The elastomeric material 32 may be composed of any suitable material such as PVC or one of the urethanes. The elastomeric material 32 is applied in an over molding operation, with the armature frame 12 comprising the mold insert. Injected into the mold cavity, the PVC or urethane elastomeric material envelopes those portions of the armature frame 12 around which space is provided. As shown in FIG. 3, the elastomeric material 32 may comprise one of the urethane foams including an elastomeric cellular substrate 34 covered by an exterior encapsulating skin 36. The skin 36 forms naturally as the foam cells collapse against the interior surfaces of the mold cavity.

The final exterior appearance of the steering wheel assembly 10 is established by the OEM design office, who may dictate the elastomeric material 32 used, surrounding the rim 28, and may require finger grooves 38 to enhance grip and feel or other similar design features. Likewise, it may be determined that either or both of the upper 22 and lower 24 spokes should have an exaggeratedly wide appearance for aesthetic and/or functional reasons. In the example embodiment illustrated in the Figures, the lower spokes 24 are designed with such an exaggerated wide body.

To prevent sagging and dimples in the elastomeric material 32 resulting from material shrinkage during the solidification process, each of the lower spokes 24 are provided with first and second stabilizers, respectively indicated at 40 and 42, integrally molded with the respective spokes 24 and encased within the elastomeric material substrate 34. These stabilizers 40, 42 are simultaneously molded with the entire armature frame 12 so that they will not slip out of position or become lost prior to the elastomeric material 32 over molding process. The stabilizers 40, 42 minimize the effect of shrinkage in the elastomeric material 32 during its solidification by occupying volume and also presenting reinforcing surfaces to which the elastomeric material 32 may adhere. By occupying volume in the exaggeratedly wide sections, less elastomeric material 32 is required to fill the space around those portions of the armature frame 12 to be encapsulated. The less elastomeric material 32 used, the less distortion due to shrinkage will be encountered. Also, the relatively significant reinforcing surfaces presented by the stabilizers 40, 42 minimize migration of the elastomeric material 32 during solidification, thereby reducing visible surface defects such as dimples. Furthermore, the stabilizers 40, 42 restrict compressibility of the substrate 34, rigidifying the exaggeratedly wide sections so that a feel more consistent with the other elastomeric material 32 covered sections of the steering wheel assembly 10 is provided.

Preferably, the first stabilizer 40 extends from the fillets 30, adjacent the rim 28. The first stabilizer 40 includes left 44 and right 46 fin surfaces extending from opposite lateral sides of the spoke 24 and disposed in a plane generally perpendicular to the steering axis A. An anchor section 48 joins each fin surface 44, 46 to the spoke 24. The outer edge 50 of each fin surface 44, 46 is shown scalloped in response to the profile of the adjacent skin 36, as shown in FIG. 2.

The second stabilizer 42 is disposed between the first stabilizer 40 and the hub 14, directly adjacent the bent section 26. The second stabilizer 42 also includes left 52 and right 54 fin surfaces. Whereas the right 44 and left 46 fin surfaces of the first stabilizer 40 are disposed in a plane generally perpendicular to the steering axis A, the left 52 and right 54 fin surfaces of the second stabilizer 42 are disposed in a plane generally parallel to the steering axis A. In other words, the reinforcing fin surfaces 44, 46 of the first stabilizer 40 are oriented at right angles to the fin surfaces 52, 54 of the second stabilizer 42. The second stabilizer 42 also includes a smaller anchor section 56 adjoining each of its reinforcing fin surfaces 52, 54 to the lower spoke 24. While the outer edge of the second stabilizer fins 52, 54 are not shown as scalloped, a protruding nose 58 extends radially outwardly, i.e., toward the rim 28, from each of the fin surfaces 52, 54. The nose 58 acts as a deflector or router during the elastomeric material 32 overmolding process. As the liquidized elastomeric material 32 is being injected into the mold cavity, it will better flow around the second stabilizer fins 52, 54, creating less turbulence than if the nose 58 were absent.

The use of the two sets of stabilizers is particularly useful in the area adjacent the bent sections 26, since the elastomeric material is particularly thick in both the width and depth dimensions. The subject method of molding a composite steering wheel assembly 10 via an over molding procedure will eliminate sags and unsightly surface imperfections in any exaggeratedly thick sections of the over molded elastomeric material 32. The steps include forming an armature mold cavity, with the mold cavity creating a central hub 14, a plurality of spokes 22, 24 radiating from the hub 14, and an annular rim 28 extending from the spokes 22, 24 and disposed concentrically about the hub 14. The step of forming the armature mold cavity further includes forming a first stabilizer 40 which is integral with two of the spokes 24, and forming a second stabilizer 42 integral with the spokes 24 and each disposed between the first stabilizer 40 and the hub 14. Next, the armature mold cavity is filled with molten metal, e.g., a magnesium alloy, which is subsequently solidified and then removed from the mold cavity to form an armature frame 14 having the described structural features. The method further includes forming a separate elastomeric material mold cavity, into which the solidified armature frame 12 is inserted. The elastomeric material mold cavity is then filled with an elastomeric material 32, e.g., PVC or a urethane, around at least a portion of the spokes 24 and the rim 28. The elastomeric material 32 is subsequently solidified to form the visible portion of the steering wheel. The first 40 and second 42 stabilizers encased within the elastomeric material 32 prevent shrinkage in the elastomeric material 32 during the solidifying step.

Constructed in the manner described above and illustrated in the Figures, the first 40 and second 42 stabilizers are effective to prevent sagging and dimples in the elastomeric material 32 resulting from material shrinkage and the resulting surface distortions during the solidification process. The stabilizers 40, 42 are simultaneously molded with the entire armature frame 12 so that they will not slip out of position or become lost prior to the elastomeric material 32 over molding process. The stabilizers 40, 42 prevent shrinkage in the elastomeric material 32 during its solidification by occupying volume and also presenting reinforcing fin surfaces to which the elastomeric material 32 may adhere. Furthermore, the stabilizers 40, 42 provide a consistent feel, i.e., compressibility, in the exaggeratedly wide sections of the elastomeric material 32 covered sections of the steering wheel assembly 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A composite steering wheel assembly comprising:

a molded armature frame comprising a central hub, a spoke radiating from said hub, and an annular rim fixedly connected to said spoke and disposed concentrically about said hub;

an elastomeric material molded around at least a portion of said spoke;

said spoke including a first extending stabilizer integrally molded therewith and encased within said elastomeric material; and a second stabilizer integrally molded with said spoke and extending laterally outwardly therefrom, said elastomeric material having an exterior surface adjacent said first stabilizer, said second stabilizer including left and right fin surfaces disposed in a plane generally perpendicular to said exterior surface, said first and second stabilizers each including an anchor section contiguous with said rim, said spoke including an enlarged fillet contiguous with said rim, said anchor section of said first stabilizer extending integrally from said fillet.

2. An assembly as set forth in claim 1 wherein said elastomeric material has an exterior surface adjacent said first stabilizer, said first stabilizer including left and right fin surfaces disposed in a plane generally parallel to said exterior surface.

3. An assembly as set forth in claim 2 wherein said spoke includes at least one bent section.

4. An assembly as set forth in claim 1 wherein said first stabilizer is disposed adjacent said rim and said second stabilizer is disposed adjacent said hub.

5. An assembly as set forth in claim 1 wherein said second stabilizer includes a nose extending radially outwardly from each of said left and right fin surfaces.

6. An assembly as set forth in claim 1 wherein said first stabilizer includes a scalloped outer edge.

7. An assembly as set forth in claim 1, wherein said spoke being encased within said elastomeric material for preventing distortion due to shrinkage in said elastomeric material during solidification thereof.

8. A composite steering wheel assembly comprising:

a molded armature frame comprising a central hub, a spoke radiating from said hub, and an annular rim fixedly connected to said spoke and disposed concentrically about said hub;

said spoke including at least one fillet contiguous with said rim;

an elastomeric material molded around at least a portion of said spoke;

said spoke including a first extending stabilizer integrally extending from said fillet and encased within said elastomeric material, and a second extending stabilizer integrally extending from said spoke and encased within said elastomeric material, said first and second stabilizers preventing distortion due to shrinkage in; and said elastomeric material having an exterior surface adjacent said first stabilizer, said first stabilizer including left and right fin surfaces disposed in a plane generally parallel to said exterior surface and said second stabilizer including left and right fin surfaces disposed in a plane generally perpendicular to said exterior surface.

9. An assembly as set forth in claim 8 wherein said first and second stabilizers each include an anchor section contiguous said rim.

10. An assembly as set forth in claim 8, wherein said first and second stabilizers preventing distortion due to shrinkage in said elastic material during solidification thereof.

* * * * *